INVENTOR
MICHEL ZIMMER
BY *Emery L. Groff Jr.*
ATTORNEY

United States Patent Office 3,436,148
Patented Apr. 1, 1969

3,436,148
SINGLE FRAME DRIVE CONTROL FOR
KINEMATOGRAPHIC CAMERAS
Michel Zimmer, Yverdon, Vaud, Switzerland, assignor to Paillard S.A., Vaud, Switzerland, a company of Switzerland
Filed June 16, 1966, Ser. No. 557,932
Claims priority, application Switzerland, July 2, 1965, 9,323/65
Int. Cl. G03b 21/38
U.S. Cl. 352—169
5 Claims

ABSTRACT OF THE DISCLOSURE

An attachment for kinematographic cameras which permits the taking of a succession of single pictures by the momentary blocking of the usual manual release member which controls the release of the film drive mechanism. The attachment is mounted on the camera in such a manner that a rod which is normally spring urged away from the release member can be urged against it by manual actuation of a cable acting on the rod through a releasable coupling means to thus achieve the desired condition for taking a single picture.

---

The present invention has for its object an attachment for kinematographic cameras which allows taking views picture by picture with a camera which is not designed for such a purpose. According to the invention, said attachment includes two members which are interconnected by a releasable coupling mechanism, the first member being adapted to actuate the conventional camera-releasing means while the second member is adapted to be shifted manually by the operator, the coupling mechanism being associated with abutment means adapted to release said mechanism at the end of the operative travel of the first member and to thus disconnect it with reference to the second member.

The accompanying drawing illustrates diagrammatically and by way of example a preferred embodiment of such an attachment. In said drawing.

Figure 1:
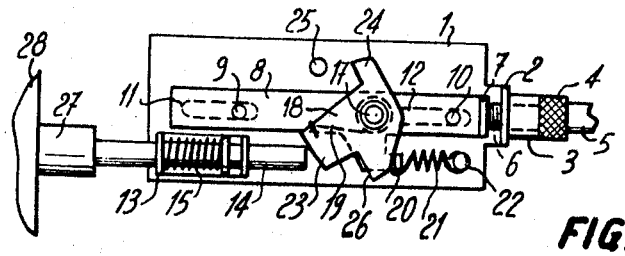
FIG. 1 is a side view of said attachment at the beginning of its operative travel.
Figure 2:
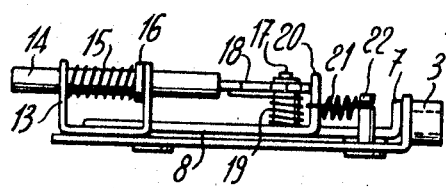
FIG. 2 is a plan view of said attachment as seen from underneath in the position illustrated in FIG. 2.

As illustrated the attachment includes a supporting plate 1 carrying an upstanding lug 2 to which is secured a socket 3 which is tapped so as to receive the connection 4 at the end of a flexible cable 5 serving for manual release of the camera. The rod 6 fitted at the end of the releasing cable 5 engages an upstanding lug 7 forming an extension of a slider 8 carrying two studs 9 and 10 slidingly engaging the corresponding alined slots 11 and 12 in the plate 1.

The plate 1 also carries a U-shaped stirrup 13, the arms of which guide a pusher rod 14 which is urged towards the right hand side of the drawing by a spring 15 fitted between a washer 16 rigid with the pusher rod 14 and one of the arms of the stirrup 13.

The slider 8 also carries a stud 17 to which is pivotally secured an actuating member 18 forming part of the releasable coupling mechanism. Said actuating member 18 is subjected to the pressure of a spring 19 surrounding the stud 17 and urging said member 18 into an anticlockwise movement until said member abuts against a stop 20 formed by an upstanding lug rigid with the slider 8. To said lug 20 is also secured a spring 21 the other end of which is secured to a stud 22 rigid with the plate 1. Said spring 21 urges the slider 8 back into its extreme right hand position illustrated in FIG. 1.

Figure 4:
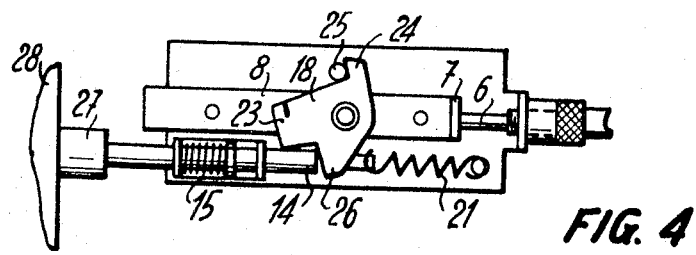

The member 18 is provided with a first nose 23 adapted to cooperate with the pusher rod 14 in its position illustrated in FIG. 1, a second nose 24 adapted to cooperate with a stop 25 carried by the plate 1 and a third nose 26 adapted also to cooperate with the pusher rod 14 when the arrangement assumes the final position illustrated in FIG. 4.

Figure 3:
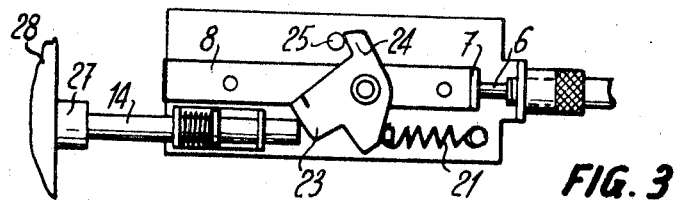
FIGS. 3 and 4 are views similar to FIG. 1 showing the attachment in two further operative stages.

When it is desired to obtain a succession of pictures one by one by means of a kinematographic apparatus which is not designed for this purpose, the attachment described is fitted on the kinematographic camera in a manner such that the pusher rod 14 registers with the releasing knob 27 of said camera, only a fraction of the front wall 28 of which has been illustrated. A thrust exerted on the releasing cable 5 allows taking a single view with the camera. To this end, at the beginning of the travel of the slider 8 out of the position illustrated in FIG. 1, said slider is coupled as shown with the pusher rod 14 by the nose 23 of the rotary actuating member 18. When continuing its travel towards the position illustrated in FIG. 3, the slider 8 thus urges the pusher rod 14 against the releasing knob 27 so as to depress the latter. At the same moment, the nose 24 on the member 18 engages the stop 25 (FIG. 3) so that during the last portion of the leftward travel of the slider 8, the rotary member 18 rocks around its pivot 17 against the action of the spring 19 whereby the nose 23 is shifted away from the end of the pusher rod 14 so as to allow a sudden rearward motion of the latter under the action of its spring 15. The pusher rod 14 then abuts against the third nose 26 (FIG. 4) of the member 18. For this last-mentioned position, the return of the releasing knob 27 into its inoperative position is sufficient for the view taking operation to be stopped so that, even if the operator acts during a substantial lapse of time on the releasing cable, the camera can only take a single view.

It should also be noted that for the position illustrated in FIG. 4 the pusher rod 14 has returned rearwardly only over a fraction of its travel, which allows keeping the releasing knob 27 in a slightly depressed position. This feature is of interest chiefly in the case where the camera includes an electric motor, the energization of which is controlled by the releasing knob slightly before the release of the film-driving mechanism and of which the deenergization is obtained only after the actual mechanical locking of said film-driving mechanism.

When the operator lets go of the releasing cable 5, the slider 8 is urged towards the right hand side of the drawing by the spring 21 and as soon as the nose 23 has moved off the right-hand end of the pusher rod 14, the rotary member 18 is returned into the position illustrated in FIG. 1 by the spring 19.

Obviously, the attachment illustrated may be executed in various manners and in particular the releasable coupling mechanism may be designed in various manners known per se. It may, for instance, be constituted by a knuckle joint of which the opening is ensured at the end of the operative travel referred to.

I claim:

1. In combination with a kinematographic camera including a releasing member producing an uninterrupted succession of picture elements, the provision of an attachment controlling said releasing member to produce only one picture element at a time and comprising a first control member adapted to be shifted forwardly by hand, a second control member adapted to depress said releasing member to produce a single picture element, a releasable coupling mechanism adapted to couple said first and second members to make the second member operate under the action of the forward movement of the first member and abutment means adapted to engage said releasable mechanism at the end of the forward movement of said first member to eliminate the coupling connection between the first and the second member.

2. An attachment for a kinematographic camera as calimed in claim 1 wherein the second control member comprises a longitudinally shiftable pusher rod and the releasable coupling mechanism comprises an actuating member adapted to be urged by the first control member in a direction in which it shifts the pusher rod longitudinally and to be shifted transversely of said pusher rod upon engagement with the abutment means to thereby release said pusher rod at the end of the forward movement of the first member.

3. An attachment for a kinematographic camera as claimed in claim 1 wherein the second control member comprises a longitudinally shiftable pusher rod and the releasable coupling mechanism includes a slider adapted to move in parallelism with the axis of the pusher rod under the action of the first control member and to which the actuating member is pivotally secured, a first nose rigid with the actuating member and adapted to engage the pusher rod to urge the latter longitudinally during the first stage of the movement of the slider under the action of the first control member, a spring acting on the actuating member to hold the latter in an angular position for which said first nose operatively engages the pusher rod, and a second nose rigid with the actuating mechanism and adapted to engage the abutment means during the last stage of said travel of the slider to thereby produce a pivotal movement of the actuating member against the action of said spring and shift the first nose away from the pusher rod and a further spring urging the pusher rod back towards its inoperative position upon release of said rod by the first nose.

4. An attachment for a kinematographic camera as claimed in claim 1 wherein the second control member comprises a longitudinally shiftable pusher rod and the releasable coupling mechanism includes a slider adapted to move in parallelism with the axis of the pusher rod under the action of the first control member and to which the actuating member is pivotally secured, a first nose rigid with the actuating member and adapted to engage the pusher rod to urge the latter longitudinally during the first stage of the movement of the slider under the action of the first control member, a spring acting on the actuating member to hold the latter in an angular position for which said first nose operatively engages the pusher rod, a second nose rigid with the actuating member and adapted to engage the abutment means during the last stage of said travel of the slider to thereby produce a pivotal movement of the actuating member against the action of said spring and shift the first nose away from the pusher rod and a third nose rigid with the actuating member and adapted to engage the pusher rod upon release of the latter by the first nose and forming a stop limiting the return travel of the pusher rod as long as the first control member remains in its forwardly shifted condition and a further spring urging the pusher rod back towards its inoperative position upon release of said rod by the first nose.

5. An attachment for a kinematographic apparatus as claimed in claim 1 comprising elastic means urging the second control member back towards its inoperative position.

References Cited
UNITED STATES PATENTS

| | | |
|---|---|---|
| 1,960,062 | 5/1934 | Morsbach et al. _____ 352—169 |
| 1,977,134 | 10/1934 | Lingg et al. |
| 2,333,972 | 11/1943 | Barr. |
| 2,742,836 | 4/1956 | Louie. |
| 2,986,067 | 5/1961 | Gopfert et al. _____ 352—169 |
| 3,147,483 | 9/1964 | Hickl _____ 352—169 |
| 3,271,098 | 9/1966 | Neudecker et al. ____ 352—169 |

JULIA E. COINER, *Primary Examiner.*

U.S. Cl. X.R.

352—137, 174, 179